May 24, 1927.

H. S. OSTDIEK

TRACTOR WHEEL

Filed Feb. 23, 1927

Inventor

H. S. Ostdiek,

By Clarence A. O'Brien
Attorney

May 24, 1927.

H. S. OSTDIEK 1,630,025

TRACTOR WHEEL

Filed Feb. 23, 1927

Inventor

H. S. Ostdiek.

By Clarence A. O'Brien
Attorney

Patented May 24, 1927.

1,630,025

UNITED STATES PATENT OFFICE.

HENRY STEPHEN OSTDIEK, OF LAWRENCE, NEBRASKA.

TRACTOR WHEEL.

Application filed February 23, 1927. Serial No. 170,308.

The present invention is directed to an improved vehicle wheel which, in the present instance, is restricted more particularly to a tractor wheel construction.

Briefly, the invention comprises a central flanged hub having radiating inter-connected yokes, the bight portions of which are especially shaped to provide anti-slipping lugs, to make for mounting of anti-slipping and traction bars, and to provide a central inwardly depressed portion.

An important feature of improvement is the peculiar configuration of the so-called yoke members which have their bights constructed to provide opposite anti-slipping lugs and an intervening depressed portion, the latter serving to straddle a ridge while the lugs engage the furrows on opposite sides of the ridge, this being permitted when the traction bars are removed.

An equally important feature is in a construction of this character wherein traction bars may be placed in position or removed at leisure to permit efficient running and traction on a completely flat surface or on a furrowed surface, whichever is desired.

Other structural features and advantages of the invention will become apparent from the following description and drawings.

In the accompanying drawings forming a part of the application and in which like numerals are employed to designate like parts throughout the same:—

Figure 1:
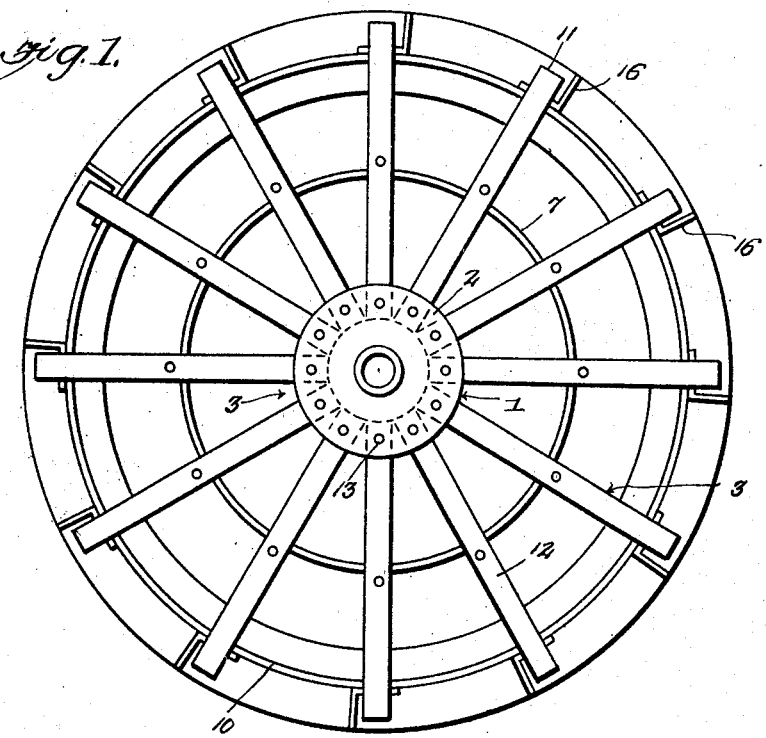
Figure 1 is a side elevation of a traction wheel constructed in accordance with the invention showing the right angular traction bars in place on the tread.
Figure 2:
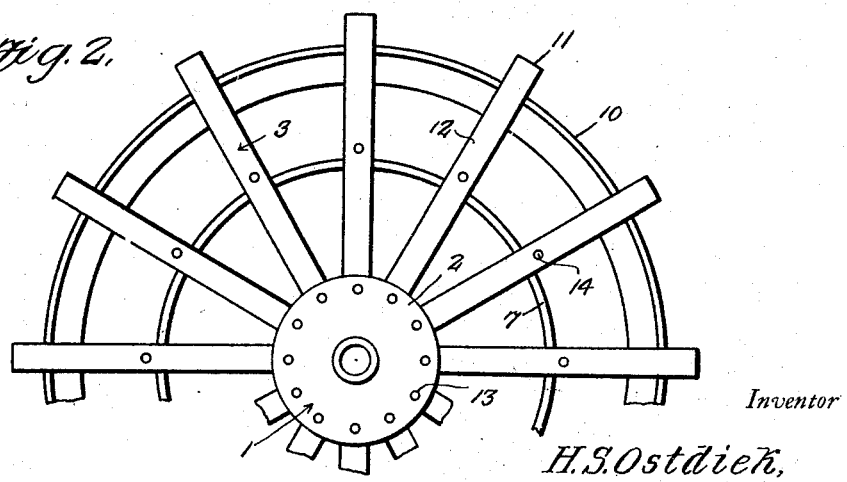
Fig. 2 is a similar view with the traction bars removed.
Figure 4:
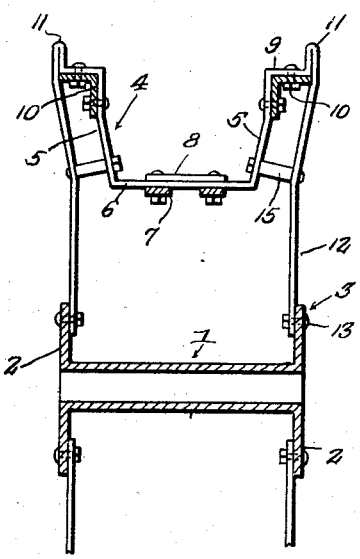
Fig. 4 is a like view through the construction shown in Fig. 2.

Attention is first invited to Fig. 4, wherein it will be seen that the reference character 1 designates a hub including a tube having outstanding flanges 2 at its outer ends, these flanges being of circular form and of appropriate diameter. Bolted or otherwise connected to the peripheral portions of these flanges 2 are the yoke members which are generally designated by the reference characters 3. A suitable number of these yoke members are employed and connected to the flanges so that they radiate therefrom in a manner shown plainly in Fig. 1.

Each member is formed from a single strip of metal of appropriate gauge, the strip being preferably flat. It will be noticed that the intermediate portion of the strip is bent to provide a substantially U-shaped part 4 which operates as an arch and is adapted to override a ridge in a planted field. This U-shaped part is composed of a pair of arms 5 and connecting portions 6. Incidentally, the connecting portion is connected to a pair of inner rings 7, the connection being made by flat sturdy strips 8 which are bolted in place as shown.

Figure 6:
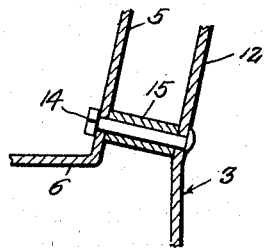
Fig. 6 is a detail fragmentary view showing the spacing sleeves between portions of the yoke member.

At the arms 5, the end portions of the metal strips or straps are directed laterally outward as at 9 and these portions are bolted to a pair of symmetrical outer rings 10 which are disposed somewhat in alinement with the flanges 2. These rings are preferably of right angular cross section. Here the strip ends are bent outwardly and upon themselves as at 11 to form anti-slipping lugs of the proportions represented. After the strap ends are formed into these lugs 11, then they are bent inwardly and into parallelism with the aforesaid arms 5 to provide attaching arms 12, which are bolted as at 13 to the flanges 2. In this connection, it will be noticed that bolts 14 (see Fig. 6) are extended through the arms 5 and 12, and spacing sleeves 15 are arranged therebetween.

Obviously, this is to make the structure rigid. In this particular embodiment, it is plain, that the U-shaped portion cooperates as an arch to straddle the row. Then the strap portions 9 on the opposite sides thereof provide a good and firm bearing surface. In addition, the lugs 11 operate to guard against slipping and to provide efficient traction.

Figure 3:
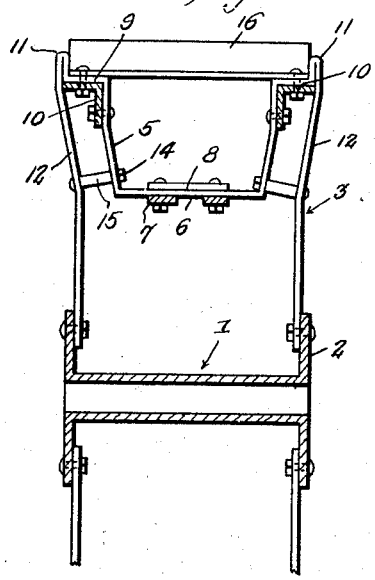
Fig. 3 is a fragmentary section through the construction shown in Fig. 1.
Figure 5:
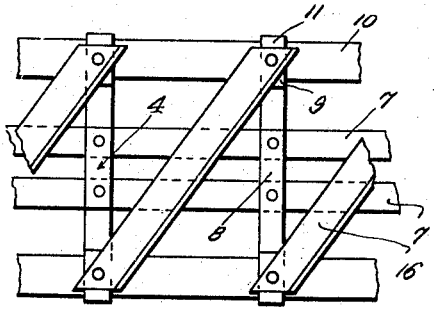
Fig. 5 is a fragmentary top plan of the tread of the wheel as represented with the traction bars in place.

In cases where the wheel is operated on substantially flat ground, having no rows and furrows, I prefer to add the traction bars 16 (see Figs. 3 and 5). These bars extend diagonally with respect to the longitudinal axis of the tread. They are of right angular form, and obviously operate somewhat in the manner of the ordinary traction plates on tractor wheels.

When in place, they bridge the arches 4.

From the foregoing description and drawings, it will be seen that I have evolved an exceptionally novel, and simple, and inexpensive tractor wheel of a convertible type, the same being usable in connection with a flat surface or a furrowed surface. In either instance, a good and firm traction is provided, and slipping is substantially prevented. As the construction is quite plain, the advantages are also apparent. Therefore, a more lengthy description is thought unnecessary.

Having thus described my invention, what I claim as new is:—

1. In a tractor wheel construction of the class described, a hub comprising a tube having outstanding flanges at its opposite ends, a plurality of radiating circumferentially spaced yoke members, each yoke member being formed from a single strap of metal, a pair of outer rings, a pair of inner rings, the end portions of the bight of each yoke being fastened to the outer rings, the central portion being arched inwardly and fastened to the inner rings, the end portions of the straps being directed outwardly and bent upon themselves to provide anti-slipping lugs and attaching arms, the free ends of the attaching arms being fastened to said flanges.

2. In a tractor wheel construction of the class described, a hub comprising a tube having outstanding flanges at its opposite ends, a plurality of radiating circumferentially spaced yoke members, each yoke member being formed from a single strap of metal, a pair of outer rings, a pair of inner rings, the end portions of the bight of each yoke being fastened to the outer rings, the central portion being arched inwardly and fastened to the inner rings, the end portions of the straps being directed outwardly and bent upon themselves to provide anti-slipping lugs and attaching arms, the free ends of the attaching arms being fastened to said flanges, and a plurality of circumferentially spaced diagonally disposed traction bars of right angular form detachably connected with said outer rings and bight portions of said yoke members.

In testimony whereof I affix my signature.

HENRY STEPHEN OSTDIEK.